United States Patent
Tomasko et al.

(10) Patent No.: US 10,436,339 B2
(45) Date of Patent: Oct. 8, 2019

(54) RUPTURE DISK

(75) Inventors: John Tomasko, Limerick (IE); Paul Goggin, Tipperary (IE); Geof Brazier, Woodbury, MN (US)

(73) Assignee: BS&B Safety Systems Limited, Limerick (IE)

( * ) Notice: Subject to any disclaimer, the term of this patent is extended or adjusted under 35 U.S.C. 154(b) by 463 days.

(21) Appl. No.: 13/499,199

(22) PCT Filed: Sep. 29, 2010

(86) PCT No.: PCT/US2010/050779
§ 371 (c)(1),
(2), (4) Date: Nov. 16, 2012

(87) PCT Pub. No.: WO2011/041456
PCT Pub. Date: Apr. 7, 2011

(65) Prior Publication Data
US 2013/0056085 A1    Mar. 7, 2013

Related U.S. Application Data

(60) Provisional application No. 61/272,497, filed on Sep. 30, 2009.

(51) Int. Cl.
*F16K 17/40* (2006.01)
*F16K 17/16* (2006.01)

(52) U.S. Cl.
CPC ..... *F16K 17/1606* (2013.01); *Y10T 29/49826* (2015.01); *Y10T 137/0396* (2015.04);
(Continued)

(58) Field of Classification Search
CPC ........... F16K 17/1606; Y10T 137/0396; Y10T 137/1692; Y10T 137/1714;
(Continued)

(56) References Cited

U.S. PATENT DOCUMENTS 3,921,556 A * 11/1975 Wood et al. ............. 29/890.141
4,102,167 A    7/1978 Wood et al.
(Continued)

FOREIGN PATENT DOCUMENTS

SU          846 908       7/1981
WO    WO 2008/155783 A1    12/2008

OTHER PUBLICATIONS

International Search Report from the European Patent Office for International Application No. PCT/US2010/050779, dated Feb. 23, 2011.

*Primary Examiner* — Minh Q Le
(74) *Attorney, Agent, or Firm* — Finnegan, Henderson, Farabow, Garrett & Dunner LLP

(57) ABSTRACT

A rupture disk (20), along with associated methods, is disclosed. More particularly, a miniaturized rupture disk is disclosed, comprising a transition area (23) configured to determine a pressure at which the rupture able portion will rupture. A method for forming a rupture disk is also disclosed, wherein a radius (R) of a transition area is configured to set the burst pressure of the rupture disk. A rupture disk having an indent at its apex (24) and a circular line of weakness configured to improve opening performance is also disclosed. Additionally, a method of relieving pressure in a pressurized system is disclosed, wherein a set of rupture disks is provided, wherein each rupture disk in the set has a different radius of transition area. A rupture disk may be selected from the set and installed based on a burst pressure set by the radius of transition area.

22 Claims, 12 Drawing Sheets

(52) U.S. Cl.
CPC .... *Y10T 137/1692* (2015.04); *Y10T 137/1714* (2015.04); *Y10T 137/1729* (2015.04); *Y10T 137/1737* (2015.04); *Y10T 137/1744* (2015.04); *Y10T 137/1752* (2015.04)

(58) Field of Classification Search
CPC ......... Y10T 137/1729; Y10T 137/1737; Y10T 137/1744; Y10T 137/1752
USPC ......... 137/68.26, 68.19, 68.23, 68.25, 68.27, 137/68.28
See application file for complete search history.

(56) References Cited

U.S. PATENT DOCUMENTS

| | | | |
|---|---|---|---|
| 4,236,648 A | 12/1980 | Wood et al. | |
| 4,363,418 A * | 12/1982 | Matz | 220/89.3 |
| 4,404,982 A | 9/1983 | Ou | |
| 4,416,388 A * | 11/1983 | Mulawski | 220/203.08 |
| 4,436,218 A * | 3/1984 | Beese | 220/89.2 |
| 4,441,350 A * | 4/1984 | Short et al. | 72/55 |
| 4,759,460 A * | 7/1988 | Mozley | 220/89.2 |
| 4,819,823 A * | 4/1989 | Kadakia et al. | 220/89.2 |
| 5,082,133 A | 1/1992 | Farwell et al. | |
| 5,154,202 A * | 10/1992 | Hibler et al. | 137/68.27 |
| 5,570,803 A * | 11/1996 | Farwell | 220/89.2 |
| 5,934,308 A * | 8/1999 | Farwell | 137/68.26 |
| 5,974,851 A | 11/1999 | Farwell | |
| 5,995,605 A | 11/1999 | Madoch et al. | |
| 6,006,938 A * | 12/1999 | Mozley et al. | 220/89.2 |
| 6,178,983 B1 | 1/2001 | Culliinane et al. | |
| 6,192,914 B1 * | 2/2001 | Farwell | 137/68.26 |
| 6,298,869 B1 * | 10/2001 | Strelow | 137/68.26 |
| 6,321,582 B1 | 11/2001 | Cullinane et al. | |
| 6,349,737 B2 * | 2/2002 | Muddiman et al. | 137/68.29 |
| 6,378,544 B1 * | 4/2002 | DiBello | 137/68.25 |
| 6,446,653 B2 | 9/2002 | Cullinane et al. | |
| 6,792,964 B2 * | 9/2004 | Farwell et al. | 137/68.25 |
| 6,959,828 B2 * | 11/2005 | Eijkelenberg et al. | 220/89.2 |
| 7,234,481 B2 * | 6/2007 | Henderson et al. | 137/68.26 |
| 7,600,527 B2 * | 10/2009 | Shaw et al. | 137/68.27 |
| 7,743,784 B2 * | 6/2010 | Rutter | 137/68.28 |
| 8,333,212 B2 * | 12/2012 | Shaw | B23C 3/34 137/15.18 |
| 9,347,576 B2 * | 5/2016 | Walker | F16K 17/16 |
| 2001/0011471 A1 * | 8/2001 | Cullinane et al. | 72/379.2 |
| 2008/0202595 A1 * | 8/2008 | Melrose et al. | 137/68.23 |
| 2010/0224603 A1 * | 9/2010 | Modena et al. | 219/121.72 |

* cited by examiner

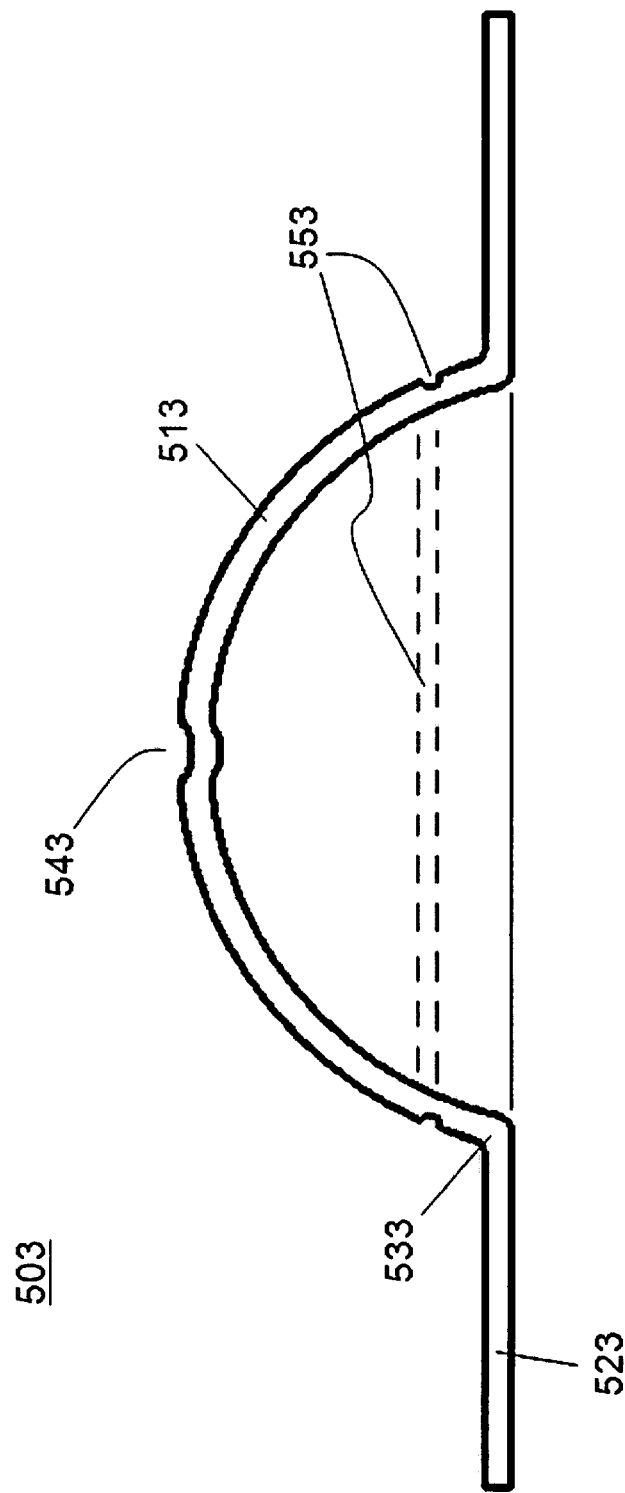

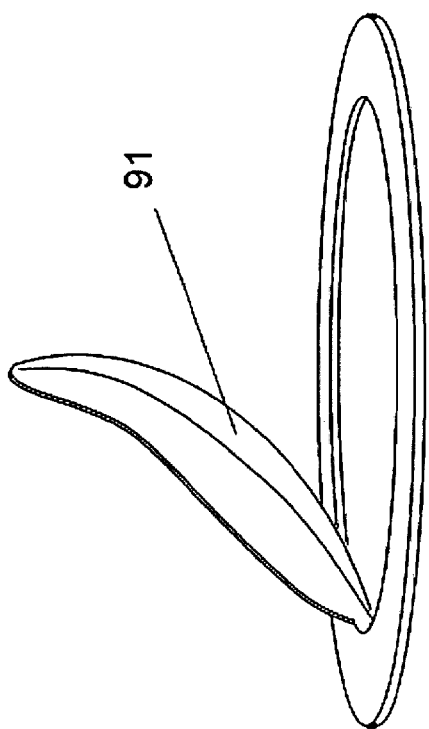
FIG. 9B
FIG. 9A

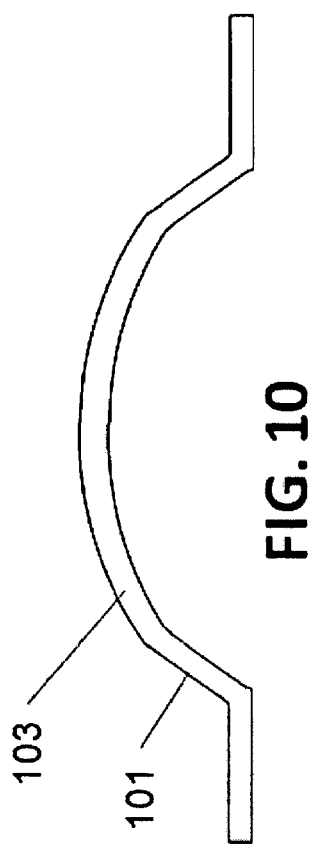

RUPTURE DISK

CROSS-REFERENCE TO RELATED APPLICATIONS

This application claims the benefit of U.S. Provisional Application No. 61/272,497, filed Sep. 30, 2009, by John Tomasko, Paul Goggin, and Geof Brazier, and titled RUPTURE DISK, the disclosure of which is hereby expressly incorporated herein by reference.

FIELD OF THE DISCLOSURE

This disclosure generally relates to a rupture disk. More specifically, this disclosure relates to a miniaturized rupture disk, along with associated methods.

BACKGROUND

A rupture disk is used to release pressure from a pressurized system in response to a potentially dangerous overpressure situation. Generally, a rupture disk has a flange that is sealed between a pair of support members, or safety heads, forming a pressure relief assembly. The pressure relief assembly may then be clamped or otherwise sealingly disposed between a pair of conventional pipe flanges or between a pair of threaded fittings in the pressurized system. A first pipe conducts pressurized fluid to one side of the pressure relief assembly and a second pipe provides an outlet to a safety reservoir or may be open to the environment. The support members include central openings that expose a portion of the rupture disk to the pressurized fluid in the system. The exposed portion of the rupture disk will rupture when the pressure of the fluid reaches a predetermined differential pressure between the inlet and outlet sides. The ruptured disk creates a vent path that allows fluid to escape through the outlet to reduce the pressure in the system.

A rupture disk typically has a dome-shaped, rounded-shaped, or other generally curved rupturable portion and can be either forward-acting or reverse-acting. A forward-acting rupture disk is positioned with the concave side of the rupturable portion exposed to the pressurized system, placing the disk under tension. Thus, when an over-pressure condition is reached—i.e., when the system pressure exceeds a safe or desirable level—the rupture disk may release pressure by bursting outward. Conversely, a reverse-acting rupture disk (also known as a reverse buckling rupture disk) is positioned with its convex side exposed to the pressurized system, placing the material of the disk under compression. Thus, when an over-pressure condition is reached, the rupture disk may buckle and reverse—i.e., invert—and tear away to vent pressurized fluid.

The rupture disk industry has historically manufactured dome-shaped, rounded-shaped, or other generally curved rupture disks by moving rupture disk material from work station to work station for sequential processing steps, either manually, by robotic arm, or by a combination of the two.

A reverse buckling rupture disk may rupture by itself upon reversal. Alternatively, additional features may be provided to facilitate rupture. For example, a cutting structure or stress concentration point may contact the reverse buckling rupture disk on reversal, ensuring that rupture occurs. Exemplary cutting structures include one or more blades (e.g., a four-part blade like that provided by BS&B Safety Systems as part of the commercially available RB-90™ reverse buckling disk, or a tri-shaped three-part blade like that provided by BS&B Safety Systems as part of the commercially available DKB VAC-SAF™ rupture disk) and circular toothed rings (e.g., like that provided by BS&B Safety Systems as part of the commercially available JRS™ rupture disk). Other exemplary cutting structures may be positioned along the periphery of a rupturable portion. Still other exemplary cutting structures may be positioned in an X-shape, Y-shape, or irregular Y-shape designed to engage with the rupturable portion upon reversal.

Rupture disk assemblies using cutting structures are described in co-owned U.S. Pat. Nos. 4,236,648 and 5,082,133, the contents of which are hereby expressly incorporated by reference in their entirety. Exemplary stress concentration points are described in co-owned U.S. Pat. No. 5,934,308, the contents of which are hereby expressly incorporated by reference in their entirety.

The predetermined pressure differential at which a rupture disk will rupture is known as the "burst pressure." The burst pressure for which a rupture disk is rated is known as the "nominal burst pressure." The burst pressure may be set by way of the rupture disk's physical parameters, such as material thickness and dome height (also known as "crown height"). The burst pressure also may be set using various physical features, such as indentations. A rupture disk having an indentation—and methods of manufacturing such rupture disks—is disclosed, for example, in co-owned U.S. Pat. Nos. 6,178,983, 6,321,582, 6,446,653, and 6,494,074, the contents of which are hereby incorporated by reference in their entirety.

In general, the burst pressure of a known rupture disk for a given nominal burst pressure can vary as a function of the applied temperature. For simple tension-loaded (e.g., forward-acting) rupture disks, the variation in burst pressure closely correlates with the variation in tensile strength associated with temperature changes of a given rupture disk material. For reverse-buckling rupture disks, the variation in burst pressure with temperature is diminished, because material tensile strength is only one parameter influencing the burst response of such structures. Because the temperature of a pressurized system may vary, a rupture disk with reduced temperature sensitivity is desirable.

Physical features, such as score lines and shear lines (and other areas of weakness, also known as lines of weakness), may be used to facilitate opening of a rupture disk and control the opening pattern of a rupture disk. In a reverse buckling disk, for example, the disk will tear along a score line when the disk is reversing. Selected portions of the disk are usually left unscored, acting as a hinge area, to prevent the disk from fragmenting upon bursting and the fragments from the disk escaping along with fluid from the pressurized system.

Fragmentation of a rupture disk is also controlled through use of a transition area. The transition area appears between a rupture disk's dome and flange portions. The rupture disk industry has focused on using a transition area with a fixed radius to assist with fragmentation control. It is generally accepted that a radius that exceeds the thickness of the disk material is the best approach to controlling rupture disk fragmentation. Typically, for a rupture disk with a higher burst pressure, both the thickness of the disk and the radius of the transition area will be increased to control rupture disk fragmentation.

Some applications require a small rupture disk that is effectively "miniaturized"—e.g., with a diameter of about one inch or smaller. Typically, the physical features describe above—such as dome height, indentations, areas of weakness, and transition areas—are used to control the burst and fragmentation of miniaturized rupture disks as well as larger-diameter rupture disks. Reliance on such parameters and features limits the range of burst pressures that can be provided in a miniaturized rupture disk, however, and may result in unreliable variation in burst pressure or the inability to produce a desired burst pressure from available stock thickness raw material.

In addition, scored miniaturized reverse buckling disks suffer drawbacks arising from the need to push an excess of dome material through a small aperture upon reversal. Thicker miniaturized reverse buckling disks particularly suffer from this problem.

In light of the foregoing, there is a need for a miniaturized rupture disk that can be configured to meet a number of different burst pressure requirements, and can provide more reliable bursting performance. The rupture disk—and associated systems and methods—of the present disclosure achieves these, or other, advantages.

SUMMARY

To attain one or more of the above or other advantages, as embodied and broadly described herein, the disclosure is directed to a rupture disk, comprising a rupturable portion; a flange portion; and a transition area connecting the rupturable portion and the flange portion, wherein the transition area is configured to determine a pressure at which the rupturable portion will rupture.

In another aspect, the disclosure is directed to a method of forming a rupture disk, comprising forming a rupture disk material into a rupturable portion, a flange portion, and a transition area; and configuring the transition area to set the burst pressure of the rupture disk.

The disclosure is also directed to a method of relieving pressure in a pressurized system, comprising providing a set of rupture disks, wherein each rupture disk in the set has a thickness, a dome height, and a transition area, and wherein each rupture disk in the set has the same thickness and dome height, and wherein each rupture disk in the set has a different transition area. The method also comprises selecting a rupture disk from the set of rupture disks based on a burst pressure determined by the transition area of the selected rupture disk, and installing the selected rupture disk into the pressurized system.

Another embodiment of the disclosure is directed to a rupture disk comprising a rupturable portion having a substantially circular line of weakness and an apex defining an indentation. The indentation is configured to initiate reversal of the rupturable portion in response to a pressure differential. The reversal results in opening of the disk about simultaneously across the entire substantially circular line of weakness, and reversal of the rupturable portion results in opening of the disk along the substantially circular line of weakness.

In another aspect, the disclosure is directed to a rupture disk comprising a rupturable portion having an apex, wherein the rupturable portion defines a hole in the apex, the rupturable portion also defining a substantially circular line of weakness. The rupture disk also comprises a seal. The rupturable portion is configured to initiate reversal at the hole in response to a pressure differential, wherein the reversal results in opening of the disk about simultaneously across the entire substantially circular line of weakness.

The disclosure is also directed to a method of forming a reverse-buckling rupture disk, comprising providing a press having a progressive die set, the progressive die set including a first die and a second die; pressing the first die to a rupture disk material to form the rupture disk material into a rupture disk shape; moving the rupture disk material to the second die after the first die has been pressed to the rupture disk material; and pressing the second die to the rupture disk material to create a rupture disk.

The disclosure is also directed to a method of forming a reverse-buckling rupture disk, comprising: providing a progressive die set; forming a structural modifier in a rupture disk material using a first die of the progressive die set; and forming a curved shape in the rupture disk material using a second die of the progressive die set.

BRIEF DESCRIPTION OF THE DRAWINGS

The accompanying drawings, which are incorporated in and constitute a part of this specification, illustrate several embodiments and together with the description, serve to explain principles of the disclosure.

FIG. 5C illustrates a miniaturized rupture disk according to an embodiment of the disclosure, including a circular score line and an indentation;

FIGS. 9A and 9B illustrate a miniaturized rupture disk according to an embodiment of the disclosure, configured to rupture without complete loss of its shape;

FIG. 10 illustrates a compound dome shape of a rupture disk according to an embodiment of the disclosure.

DESCRIPTION OF THE EMBODIMENTS

Reference will now be made in detail to the present exemplary embodiments, examples of which are illustrated in the accompanying drawings.

Figure 1:
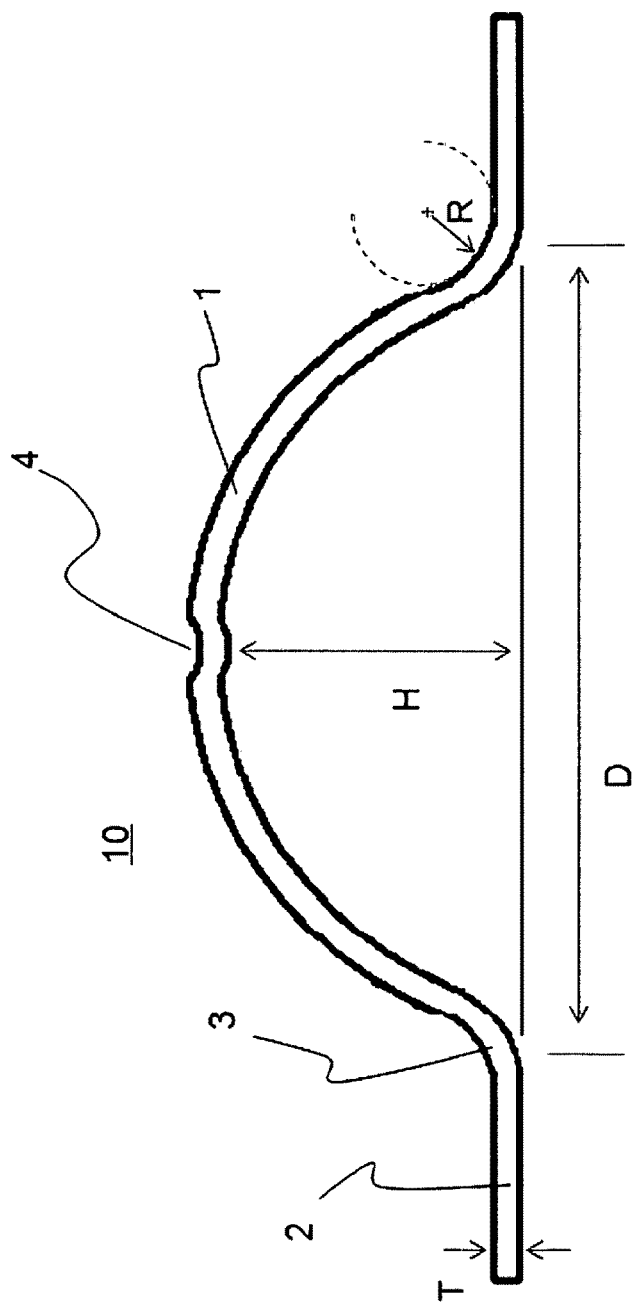
FIG. 1 illustrates a cross-sectional view of a known rupture disk.

An exemplary known reverse-acting rupture disk 10 is shown in FIG. 1. The rupture disk 10 is provided with a rupturable portion 1 and a flange portion 2, with a transition area 3 between the rupturable portion 1 and flange portion 2. While the flange portion 2 is substantially flat, the rupturable portion 1 is generally arcuate in cross-section. As illustrated in FIG. 1, the rupturable portion 1 is substantially spherical. As is understood in the art, the burst pressure of the rupture disk 10 of FIG. 1 is a function of a number of parameters and features, such as, but not necessarily limited to: disk thickness T, dome height H, and indentation 4. The fragmentation of the rupture disk 10 of FIG. 1 is controlled through the use of a fixed-radius transition area 3 having a radius R. In known rupture disks, the radius R has been kept greater than the thickness T to help control fragmentation. These parameters and features have been used regardless of a rupture disk's size to control the rupture disk's burst pressure and fragmentation.

The rupture disk 10 of FIG. 1 may be "miniaturized"— i.e., designed with a diameter D of about one inch or less. A miniaturized rupture disk 10 is generally manufactured from a coil metal material. Such coil metal materials are available in a limited number of standard thicknesses T. For example, a coil metal material may be provided with thicknesses T varying in increments of 0.002 or 0.003 inches: e.g., 0.010-inch thickness, 0.012-inch thickness, 0.014-inch thickness, and so forth. Rupture disks made from increasingly thick coil metals will have increasingly high burst pressures. In a miniaturized rupture disk, however, increasing the coil thickness by 0.002 inches, e.g., has a drastic effect on the rupture disk's burst pressure. Thus, by simply varying the thickness T of its miniaturized rupture disks, a manufacturer can meet only a very crude number of burst pressure requirements with significant jumps between burst pressure values (e.g., from 1000 psig, to 1500 psig, to 2000 psig). As a result, the limited material thicknesses available to a manufacturer prevent the manufacturer from providing a seamless product line of miniaturized rupture disks, particularly reverse buckling disks, with burst pressures ranging regularly from, for example, 1000 psig to 2000 psig. A customer may not be able to obtain a miniaturized rupture disk having an accurate burst pressure of 1750 psig, for example. Thus, such a customer may have to rely on a lower burst pressure disk than desired, risking unnecessary opening of the disk. Alternatively, such a customer may have to rely on a higher burst pressure disk than desired, risking potentially dangerous overpressure situations.

A miniaturized rupture disk's 10 dome height H may also be varied in an attempt to fine tune the burst pressure of the disk 10 and fill out a spectrum of desired burst pressures. That is, for a 0.012-inch thick miniaturized reverse buckling rupture disk 10, a manufacturer may provide dome heights H ranging from, e.g., 0.10 inches to 0.20 inches for a ½-inch nominal diameter disk. Because of the limited thicknesses of available coil metals, however, varying dome height still fails to provide a spectrum of burst pressures without significant gaps. For example, manufacturing miniaturized reverse buckling rupture disks with varying dome heights may allow for burst pressures of 1000 psig to 1500 psig and 1800 psig to 2200 psig using two standard-thickness materials (e.g., 0.010-inch thick and 0.012-inch thick), but leave a gap of burst pressures between about 1500 psig and 1800 psig.

Physical features such as an indentation 4, illustrated in FIG. 1, similarly fail to create a full spectrum of burst pressures at which a miniaturized reverse buckling rupture disk 10 may reliably rupture. Indent technology tends to break down as domed structures are miniaturized. Whereas an indented disk can be made to reverse at a lower pressure than a non-indented disk, the effect is minimized with small structures (i.e., miniaturized rupture disks). For example, tests comparing indented and non-indented miniaturized reverse buckling rupture disks have shown that an indented ½-inch nominal size rupture disk reversed, on average, within 1% of the pressure at which the non-indented rupture disk reversed. Thus, although indentation may be used to moderately improve ranges of burst pressures in miniaturized reverse buckling rupture disks, its ability to achieve a desired reversal pressure is limited.

The transition area 3 of the rupture disk 10 of FIG. 1 is used to control the rupture disk's fragmentation. In standard practice, the transition area 3 has a fixed radius R—exceeding the thickness of the disk material—to control fragmentation. If the disk of FIG. 1 is miniaturized, however, the influence of the transition area 3 on the disk's reversal and rupture is undesirably pronounced, as the transition itself contributes to an increasingly higher ratio of the total reverse buckling structure area. As a result, the typical transition radius R—when used in a miniaturized rupture disk 10—produces poor reversal action and increasing variation (i.e., less predictability) in reversal pressure.

In a miniaturized rupture disk, the typical transition area illustrated in FIG. 1 leads to a low kinetic energy reversal once burst pressure is reached. That is, when the miniaturized disk 10 of FIG. 1 reverses, it does so relatively slowly. Best burst performance of a rupture disk is achieved through a high kinetic energy snap action when a reverse buckling disk reverses. The high kinetic energy from a snap action helps the rupture disk to break on its own. Alternatively, if a cutting structure or stress concentration point is used to facilitate bursting on reversal, the high kinetic energy from a snap action ensures that the reverse-acting rupture disk will contact the cutting structure with sufficient energy to ensure opening. Because a miniaturized rupture disk using a typical transition area 3 reverses without such a snap action, its performance may be inconsistent, and it may not consistently open when the burst pressure is reached.

Figure 2:
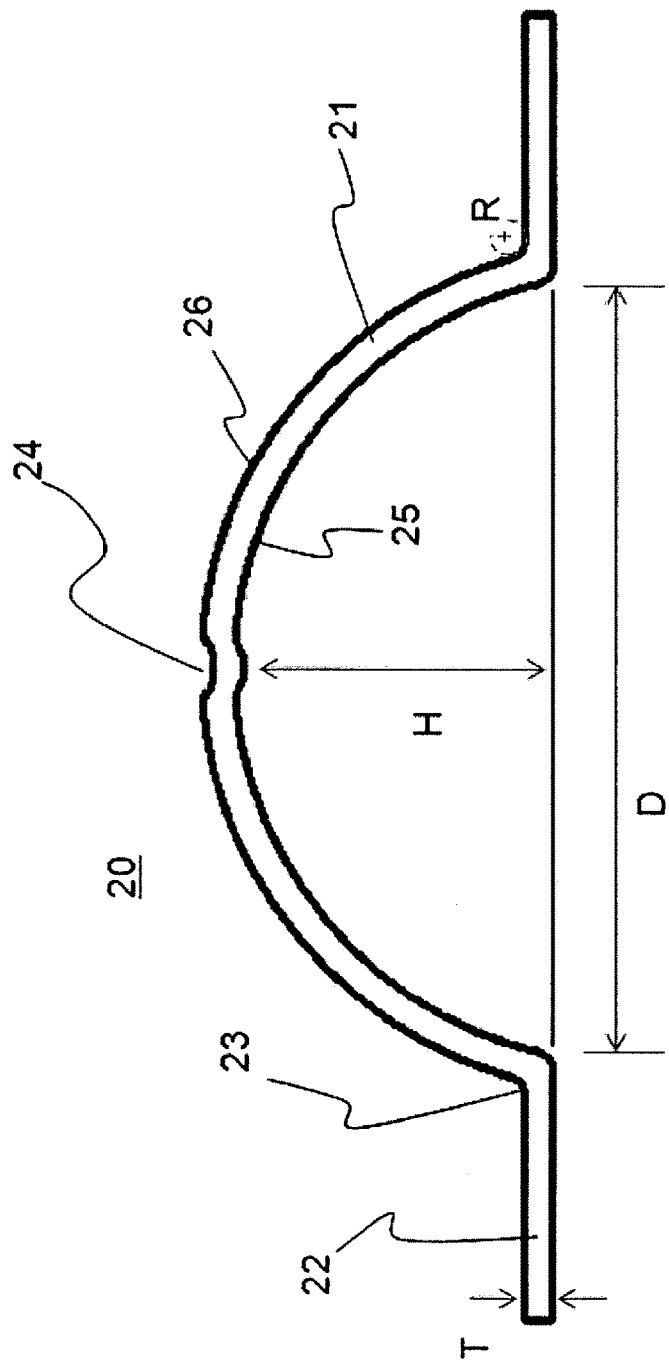
FIG. 2 illustrates a cross-sectional view of a miniaturized rupture disk according to an embodiment of the disclosure.

To solve these, or other, problems of known miniaturized rupture disks, an exemplary miniaturized rupture disk 20 according to the present disclosure is illustrated in FIG. 2. Rupture disk 20 includes a rupturable portion 21, flange portion 22, and transition area 23. As illustrated in FIG. 2, the miniaturized rupture disk 20 is a reverse-acting rupture disk. That is, convex side 26 of the rupturable portion 21 is exposed to the pressurized system, concave side 25 of the rupturable portion 21 is exposed to the outlet, and bursting of the rupture disk 20 is accompanied by the reversal of the rupturable portion 21. As illustrated in FIG. 2, the miniaturized rupture disk 20 includes a substantially spherical rupturable portion 21. The present disclosure contemplates rupture disks of different geometries, including ovoid shapes, and other shapes that are generally arcuate in cross-section, including shapes that are asymmetrical in cross section. Although the rupture disk in FIG. 2 is a reverse-acting rupture disk, the present disclosure also contemplates application to a forward-acting rupture disk.

The miniaturized reverse buckling rupture disk 20 of FIG. 2 is also provided with a transition area 23 designed to improve the disk's performance. Previously, it has not been recognized that the radius of a transition area may be used to set the burst pressure of a miniaturized rupture disk. Instead, the radius of a transition area has been used to control fragmentation, and, thus, has been fixed depending on the size of the rupture disk. It has been accepted that a radius of transition area greater than the thickness of the rupture disk is used to control fragmentation. Therefore, it has especially gone unrecognized that providing a radius of transition area less than the thickness of the rupture disk can be useful to improve rupture disk performance and set the burst pressure of a miniaturized rupture disk.

In view of the foregoing, according to the present disclosure, the radius R of the transition area 23 may be chosen to set the burst pressure of the rupture disk 20. Thus, for a miniaturized rupture disk 20 of the present disclosure, a manufacturer may vary a radius R of the transition area 23 to fill out the spectrum of desirable burst pressures for a line of rupture disks. It has been shown that the range of potential burst pressures in such miniaturized rupture disks is substantially improved over that of known miniaturized rupture disks that rely primarily on disk thickness T and dome height H to set burst pressure. The burst pressure of a rupture disk will depend on a number of factors; therefore, when a radius of the transition area is referred to as "setting" or "determining" the burst pressure of the rupture disk, it is understood that the radius of the transition area is used to contribute to the control of the burst pressure, and that other factors, such as disk thickness T and dome height H may also play a role in controlling the burst pressure of the rupture disk. Thus, according to the present disclosure, using the radius of the transition area to set or determine the burst pressure does not exclude accounting for other factors.

Figure 3C:
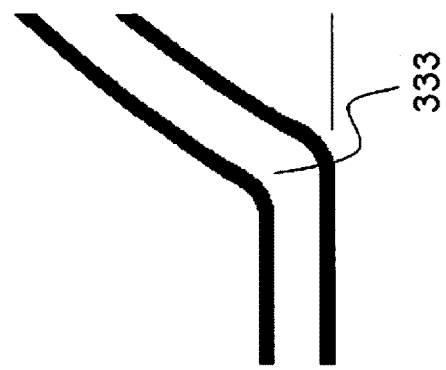
FIG. 3C illustrates a rupture disk transition area having a tight radius, according to an embodiment of the disclosure.
Figure 3B:
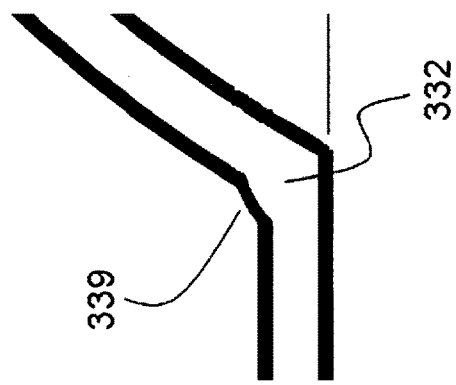
FIG. 3B illustrates a rupture disk transition area having a light chamfer, according to an embodiment of the disclosure.
Figure 3A:
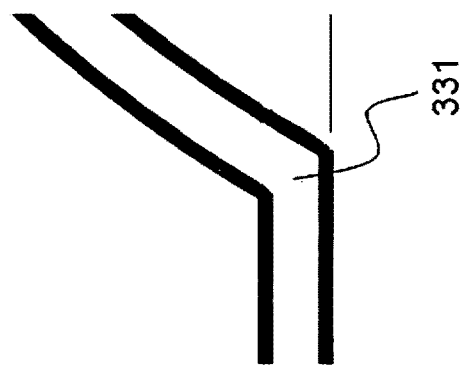
FIG. 3A illustrates a rupture disk transition area having a sharp transition, according to an embodiment of the disclosure.
Figure 4A:
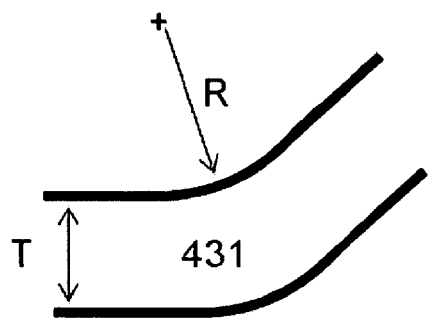
FIG. 4A illustrates a known rupture disk transition area having a radius of one and one-half times the thickness of the rupture disk.
Figure 4B:
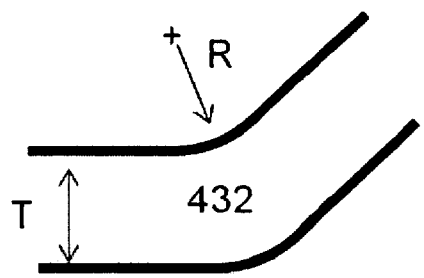
FIG. 4B illustrates a known rupture disk transition area having a radius equal to the thickness of the rupture disk.
Figure 4C:
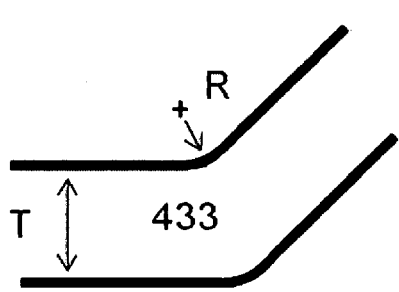
FIG. 4C illustrates a rupture disk transition area according to an embodiment of the disclosure, having a radius one-half the thickness of the rupture disk.
Figure 4D:
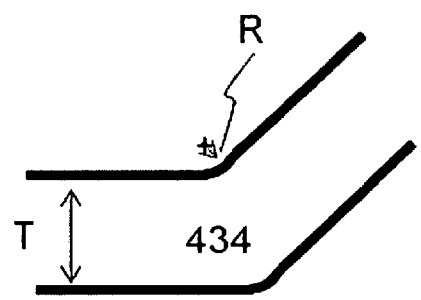
FIG. 4D illustrates a rupture disk transition area according to an embodiment of the disclosure, having a radius one-quarter the thickness of the rupture disk.
Figure 4E:
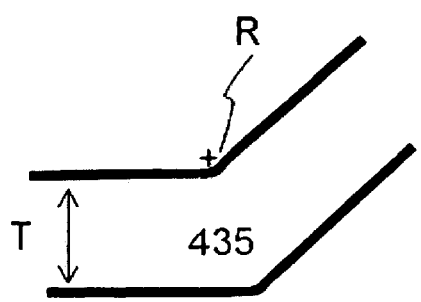
FIG. 4E illustrates a rupture disk transition area according to an embodiment of the disclosure, having a radius one-eighth the thickness of the rupture disk.

Additionally, the miniaturized rupture disk of the present disclosure may be provided with a relatively abrupt transition area specifically selected to set the burst pressure of the rupture disk. For example, the miniaturized rupture disk of the present disclosure may be provided with a well-defined (relatively sharp) edge transition area 331 as illustrated in FIG. 3A. Alternatively, the miniaturized rupture disk may be provided with a transition area 332 including a light chamfer 339 as illustrated in FIG. 3B or a transition area 333 with a tight radius as illustrated in FIG. 3C. The chamfer 339 may be selected or dimensioned to control, set, determine or otherwise contribute to a burst pressure of the rupture disk. In one embodiment wherein the miniaturized rupture disk comprises a transition area with a tight radius, the radius may be less than the thickness of the rupture disk. In prior miniaturized rupture disks, the transition area radius may be equal to the thickness T of the rupture disk, to control fragmentation, as illustrated in the transition area 432 shown in FIG. 4B. Alternatively, in prior miniaturized rupture disks, the radius R may be greater than thickness T, to control fragmentation, as illustrated in the transition area 431 of FIG. 4A. In a rupture disk according to the present disclosure, however, the radius R may be less than the thickness T of the disk, as illustrated in FIGS. 4C-4E. The radius R of the transition area 433 illustrated in FIG. 4C is one-half of the thickness T of the rupture disk. The radius R of the transition area 434 illustrated in FIG. 4D is one-fourth of the thickness T of the rupture disk. The radius R of the transition area 435 illustrated in FIG. 4E is one-eighth of the thickness T of the rupture disk. As discussed above, a manufacturer may set the burst pressure of a miniaturized rupture disk by selecting a specific radius of transition area. Specifically, a manufacturer may select a smaller radius of transition area to increase a miniaturized rupture disk's burst pressure, or a larger radius of transition area to decrease a miniaturized rupture disk's burst pressure.

Furthermore, it has been shown that a miniaturized rupture disk including a transition area such as those illustrated in FIGS. 3A-3C and 4C-4E provides improved performance over known miniaturized rupture disks. Providing a well-defined edge transition area has been shown to increase burst pressure substantially in a miniaturized rupture disk. For example, it has been shown in a rupture disk with a ⅜-inch nominal dome structure and a typical 0.050-inch radius transition area, the burst pressure is 9,000 psig. By contrast, a rupture disk according to the present disclosure, with a ⅜-inch nominal dome structure and a lightly broken edge has a burst pressure of 11,000 psig.

In addition, a miniaturized rupture disk of the present disclosure—wherein the transition area may range from a sharp edge to an exemplary radius of about 0.010 inches—results in a high kinetic energy reversal (i.e., snap action) that provides more reliable burst or rupture. It has been shown that snap action (i.e., higher kinetic energy) improves as the transition area radius is decreased. Thus a miniaturized disk according to the present disclosure may have an improved snap action.

The transition area as disclosed herein may be configured uniformly along its circumference. For example, a transition area may be provided with a uniform radius, uniform chamfer, or uniform sharp corner along its circumference. The disclosure, however, is not limited to such uniform configurations. A transition area may also be an irregular transition area, wherein, e.g., a radius, chamfer, or corner feature may be present for less than the complete circumference. A transition area may also include a feature that changes dimension around its circumference. For example, one part of a transition area may have a first radius, while another part of the transition area may have a different, second radius. Likewise, one part of a transition area may have a first chamfer, while another part of the transition area may have a different, second chamfer. In addition, a transition area may include a combination of features. For example, a transition area may include one portion having a radius and another portion having a chamfer and/or a sharp corner. In addition one or more features of a transition area may be intermittently provided around its circumference.

Figure 5B:
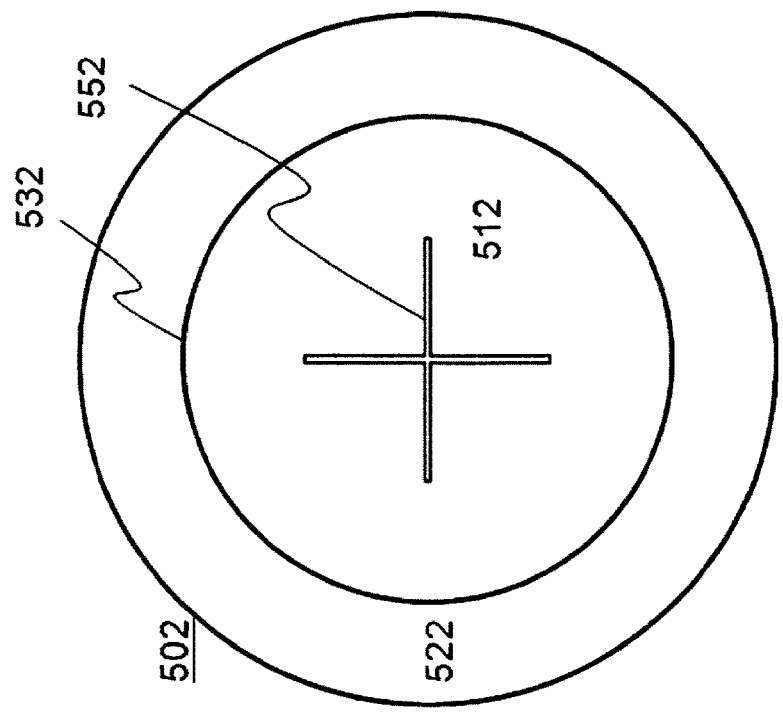
FIG. 5B illustrates a miniaturized rupture disk according to an embodiment of the disclosure, including a cross score line.
Figure 5A:
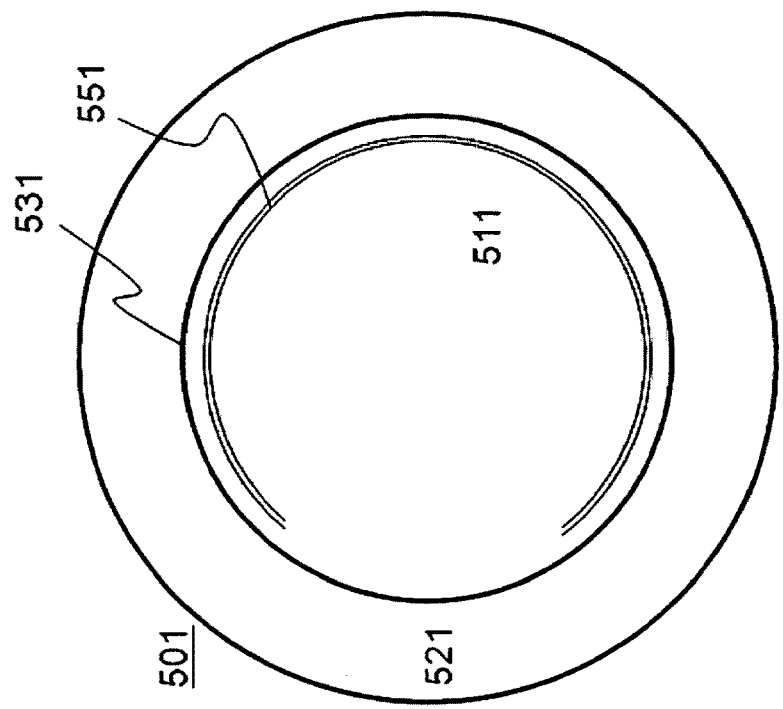
FIG. 5A illustrates a miniaturized rupture disk according to an embodiment of the disclosure, including a circular score line.
Figure 8:
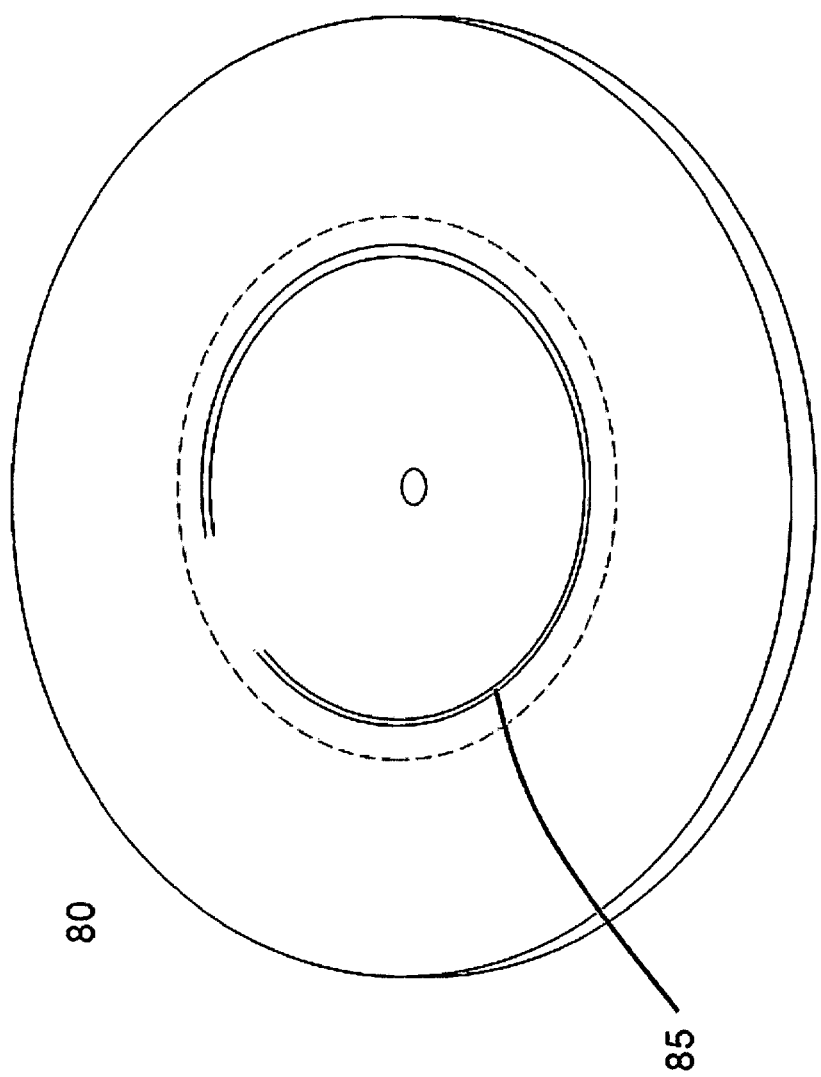
FIG. 8 illustrates a miniaturized rupture disk including a score line on the concave side of the rupture disk, according to an embodiment of the disclosure.

Another embodiment of the present disclosure is illustrated in FIG. 5A. The miniaturized rupture disk 501 of FIG. 5A includes a rupturable portion 511, a flange portion 521, a transition area 531, and a circular score line 521 along which the rupture disk 501 will rupture. The circular score line 521 may occupy less than a complete circle. For example, the score line may extend along between 270 and 330 degrees of a circle. Although FIG. 5A illustrates a circular score line 521 on the convex side of a rupture disk 501, a circular score line may also be placed on the concave side of a rupture disk, as illustrated in FIG. 8. Circularly scored rupture disks are described in co-owned U.S. Pat. No. 4,404,982, the contents of which are hereby incorporated by reference in their entirety. Providing a circular score line 521 results in improved performance in a miniaturized reverse buckling rupture disk.

Another embodiment of a miniaturized reverse-acting rupture disk 502 relies on a cross score line 552, such as that illustrated in FIG. 5B and disclosed in co-owned U.S. Pat. No. 4,441,350, the contents of which are hereby expressly incorporated by reference in their entirety. The reverse buckling disk 502 of FIG. 5B has a rupturable portion 512, flange portion 513, transition area 532, and a cross score line 552. Using a cross scored design, however, requires the rupturable portion 512 of the disk to be pushed through itself to cause opening at the score line 552. In a miniaturized reverse-acting rupture disk, the disk material may be relatively thick, making it difficult to push the disk material through itself. As a result, repeatable burst pressures must be very high in cross-scored designs—several thousand psig in the case of a 0.5-inch diameter rupture disk and over 10,000 psig in the case of a 0.25-inch diameter disk. By contrast, using a circular score line 551, according to FIG. 5A of the present disclosure, results in substantially lower repeatable burst pressures. Particularly positive results have been observed in terms of repeatability and good tearing when combining a circular score line 551 covering approximately 300 degrees of the circle with a well-defined transition according to the present disclosure. Although as illustrated in FIG. 5A, the circular score line appears in the rupturable portion 511, a circular score line may alternatively be positioned in the transition area of the rupture disk. In one embodiment, the circular score line may be positioned in the flange portion of the rupture disk.

A circular scored miniaturized reverse buckling disk 501 also may have better opening characteristics than a cross-scored disk. Upon reversal of the disk 501, a circular score line 551 results in a controlled single petal of material that must rotate into the open position without significantly obstructing the flow of escaping fluid.

As illustrated in FIG. 5C, one embodiment of a miniaturized reverse buckling rupture disk 503 may include a score line or other line of weakness 553 and a structural modifier. As shown, the structural modifier may take the form of an indent 543. The miniaturized rupture disk illustrated in FIG. 5C also has a rupturable portion 513, flange portion 523, and transition area 533. The addition of a structural modifier may stabilize the burst pressure accuracy of a miniaturized rupture disk. In general, because a circular score line of between 270 and 330 degrees of a circle may be provided, the absence of a complete circle may lead to an irregular displacement of material. Such an irregular displacement of material may result in an irregular stress pattern in the rupture disk, which may lead to an unreliable burst pressure. The irregular displacement effect is more pronounced in miniaturized rupture disks, and less pronounced in larger rupture disks (e.g., over one-inch in diameter). Thus, providing a structural modifier in a miniaturized rupture disk results in a more pronounced benefit than in a larger rupture disk with respect to ensuring burst pressure accuracy.

According to the present disclosure, a structural modifier, such as an apex indentation, may be provided in a miniaturized rupture disk without modifying the nominal burst pressure of the rupture disk. Heretofore, apex indenting has tended to lower burst pressures. However, it has been observed according to the present disclosure that in a miniaturized rupture disk, an apex indent can be configured to improve burst pressure accuracy without lowering the burst pressure.

According to the embodiment illustrated in FIG. 5C, the indent 543 and line of weakness 553 may be configured to improve opening of the miniaturized reverse buckling rupture disk 503. In an overpressure situation, the miniaturized reverse buckling rupture disk 503 may initiate reversal at indent 543. The disk 503 continues to collapse radially outward in a wave of collapse. When the wave of collapse reaches the line of weakness 553, the rupture disk 503 material is torn along the line of weakness. Thus, when the indent 543 is properly configured, the wave of collapse may reach substantially each point along the line of weakness 553 at substantially the same point in time. As a result, the disk 503 may open symmetrically along the line of weakness 553, which may lead to improved opening performance. In the absence of an indent 543, or in the presence of an indent not configured correctly, the collapse of the dome may not proceed in a progressively radial manner from the apex of the dome outward. As a result, the line of weakness 553 may experience asymmetrical loading, which can result in an asymmetrical or irregular opening of the disk 503 along the line of weakness 553. Thus, by configuring the indent 543 in conjunction with the line of weakness 553, a manufacturer may ensure substantially more symmetrical opening of the disk 503.

Figure 6A:
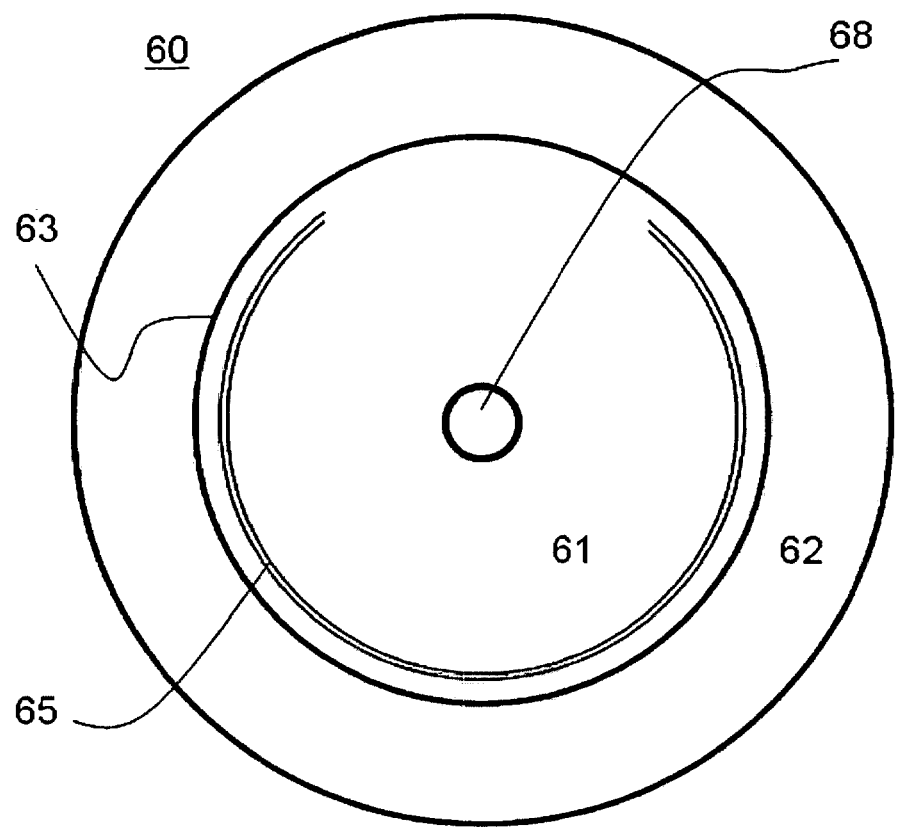
FIGS. 6A and 6B illustrate a miniaturized reverse buckling rupture disk according to an embodiment of the disclosure, including a hole at its apex.
Figure 6B:
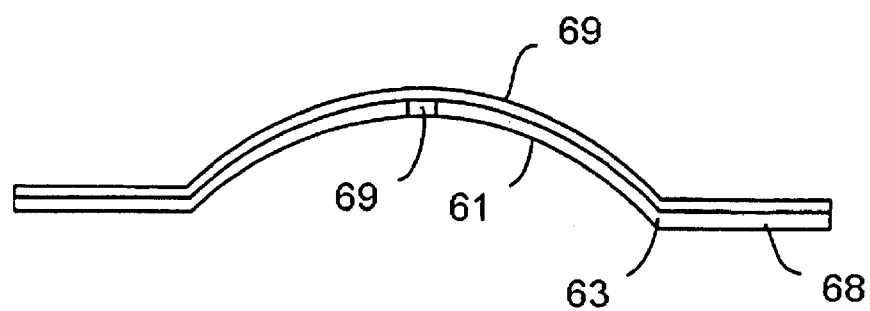

According to another embodiment of the disclosure, illustrated in FIGS. 6A and 6B, a miniaturized reverse buckling rupture disk 60 may be provided with a rupturable portion 61, flange portion 62, and transition 63. A score line 65 or other area of weakness may be provided in the rupture disk 60. As illustrated in FIG. 6A, the score line may be substantially circular. The rupture disk 60 may also define a hole 68 at its apex. As illustrated in FIG. 6B, the rupture disk 60 may be paired with a seal 69, which may prevent pressurized fluid from escaping through the hole 68. The seal 69 may be positioned on a convex side of the miniaturized reverse buckling rupture disk 60. A rupture disk including a hole and paired with a seal is disclosed in co-owned U.S. Pat. No. 6,321,582, the contents of which are expressly incorporated herein in their entirety as set forth above.

In the embodiment illustrated in FIGS. 6A and 6B, the hole 68 may be configured to cause the disk 60 to initiate rupture at its apex. Similarly to the embodiment illustrated in FIG. 5C, the disk 60 may then reverse radially outward in a wave of collapse. When the wave of collapse meets area of weakness 65, the disk 60 may open along the area of weakness 65. When the disk 60 opens, seal 69 may open as well, allowing pressurized fluid to escape the system. When the hole 68 is properly configured, the wave of collapse may reach substantially each point along the line of weakness 65 at substantially the same point in time. As a result, the disk 60 may open symmetrically along the line of weakness 65, which may lead to improved opening performance.

It has been shown that a miniaturized rupture disk according to the present disclosures has achieved a number of benefits in addition to those previously described. A miniaturized rupture disk according to the present disclosure may exhibits a resistance to variable operating pressures that can reach over 80% or 90% of burst pressure. A miniaturized rupture disk according to the present disclosure may also exhibit resistance to highly cyclic operating pressure conditions, which can impart hundreds of thousands of pressure cycles over the desired operating life of the rupture disk. A miniaturized rupture disk according to the present disclosure may be configured to exhibit burst pressures in the range of 500 psig to 15,000 psig. Such a rupture disk is particularly useful for hydraulic applications where the extreme leak tightness of a rupture disk is desired.

A miniaturized rupture disk according to the present disclosure may exhibit minimal variation in burst pressure with temperature. The variation of burst pressures for various rupture disks made of nickel alloy 600 (also known as Inconel 600) at various temperatures are presented in the table below, where "SKr" is a solid-metal reverse-acting disk with an apex indentation offered for sale by BS&B Safety Systems, "B Disk" is a solid metal forward-acting disk offered for sale by BS&B Safety Systems, "XN" is a solid metal forward-acting disk with cross-shaped lines of weakness offered for sale by BS&B Safety Systems (nominally sized one-inch or larger), and "Disclosure" is an exemplary rupture disk according to the present disclosure, in the form of a reverse-buckling rupture disk with a circular line of weakness and a structural modifier in the form of an apex indentation (nominally sized below three-quarters of an inch):

| Temperature (° C.) | SKr | B Disk | XN | Disclosure |
|---|---|---|---|---|
| −40 | 1.09 | 1.08 | 1.04 | 1.03 |
| 22 | 1.00 | 1.00 | 1.00 | 1.00 |
| 125 | 0.95 | 0.94 | 0.94 | 0.97 |
| 250 | 0.89 | 0.93 | 0.91 | 0.96 |

In the table above, a factor of 1.00 is the burst pressure of the rupture disk at ambient temperature, 22° C. A factor of 1.03, for example, indicates that the burst pressure is 1.03 times the burst pressure at ambient temperature. A factor of 0.96, for example, indicates that the burst pressure is 0.96 times the burst pressure at ambient temperature. A measure of temperature sensitivity, defined as the variation factor, can be calculated by subtracting the burst pressure factor at −40° C. from the burst pressure factor at 250° C. As illustrated above, the variation factor between burst pressure factor at −40° C. and 250° C. is smaller for the rupture disk of the present disclosure (0.07) than it is for the SKr disk (0.20), B disk (0.15), and XN disk (0.13). Thus, as illustrated by the foregoing table, the present disclosure exhibits thermal stability equal to or better than traditional rupture disk designs. In one embodiment, a rupture disk may have a variation factor of less than two-thirds that of a one-inch or larger reverse buckling disk. In another embodiment, a rupture disk may have a variation factor of less than one-half that of a one-inch or larger reverse buckling disk. In yet another embodiment, a rupture disk may have a variation factor less than that of a nickel alloy 600 (i.e., Inconel 600) forward-acting rupture disk of a similar size. In still another embodiment, a rupture disk may have a variation factor less than 0.1. The variation factor may be minimized based on configuration of the transition area, use of a structural modifier, the disk general shape, or any suitable combination of these factors.

While a reverse-acting rupture disk has been generally described as involving buckling, or reversal, of a domed or curved rupturable portion prior to rupture, it is also contemplated that the rupturable portion may not necessarily buckle or reverse prior to rupture. An example of such a rupture disk is illustrated in FIGS. 9A-9B. As shown in FIGS. 9A-9B, the rupturable portion 91 of the rupture disk opens without complete loss of its original shape. That is, the rupturable portion is convex toward the pressure source at all times.

Now turning to manufacture of an embodiment of the present disclosure, a miniaturized reverse buckling disk may be manufactured by any suitable method. It may be particularly cost effective to manufacture a miniaturized reverse buckling disk by stamping and forming rather than machining. Moreover, a machined rupture disk may not function as well in smaller sizes and at pressures below about 3000 psig. For example, the machined rupture disk described in co-owned U.S. Pat. No. 4,102,167, as well as the machined rupture disk commercially available from BS&B Safety Systems as the MRB rupture disk, may rely on a thin rupture disk material, which requires extreme tolerances that may not reasonably be achieved in a miniaturized rupture disk. In addition, the retention between a thin machined rupture disk and its peripheral body tends to become increasingly unstable when subject to pressure from the convex side. Moreover, the MRB rupture disk is a fragmenting rupture disk design—a performance characteristic not desired in many applications.

In one embodiment, a miniaturized reverse buckling rupture disk may be manufactured by a hard stamping process. During the hard stamping process, the disk material is pushed in a manner that does not thin the disk at its apex. Alternatively, any other suitable manufacturing method may be used to form a miniaturized reverse buckling rupture disk, including hydraulic forming, which may selectively thin the disk at its apex.

Figure 7A:
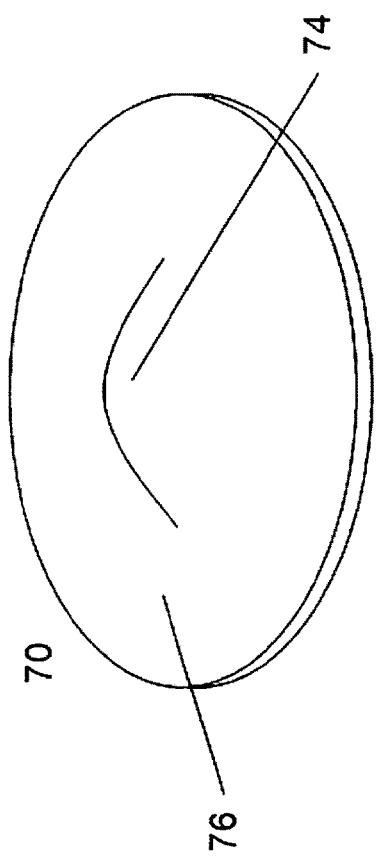
FIGS. 7A-7C illustrate the steps in a method of manufacturing a miniaturized rupture disk according to an embodiment of the disclosure.
Figure 7B:
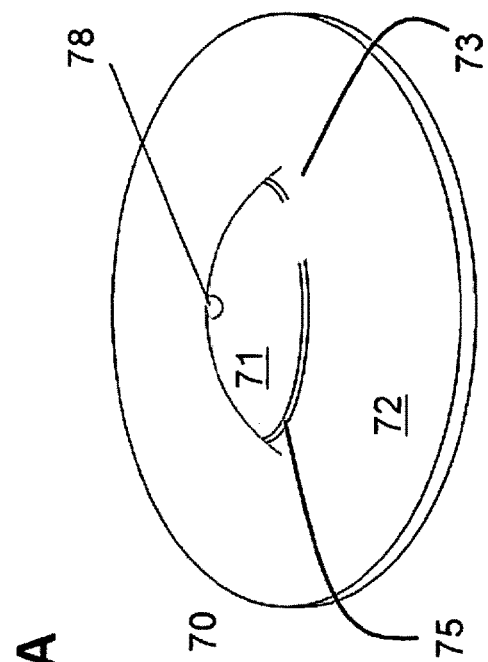
Figure 7C:
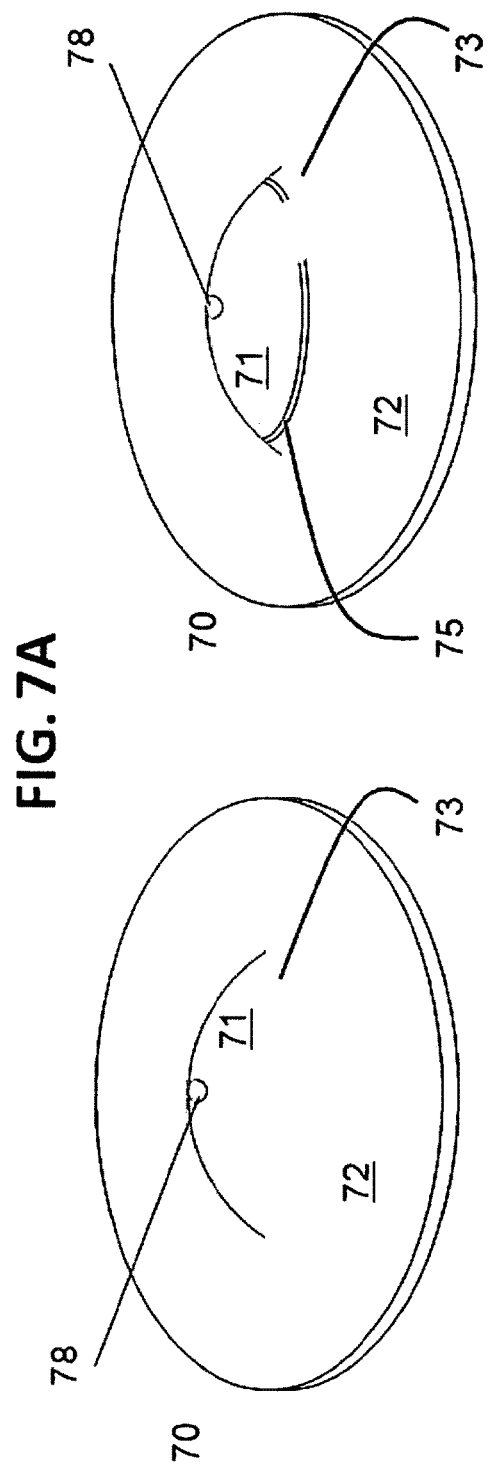

In another embodiment, a miniaturized rupture disk may be manufactured in a series of steps. First, a disk blank 76 or other disk material may be indented to form an indent 74 while in a flat condition, as illustrated in FIG. 7A. Second, the disk 70 may be formed into a spherical or other actuate shape by mechanical stamping in a die set or progressive die set, thereby forming a rupturable portion 71, flange portion 72, and transition area 73, as illustrated in FIG. 7B. Third, the rupture disk may be scored as illustrated in FIGS. 7C and 7D. Although the score line 75 illustrated in FIGS. 7C and 7D appears on the convex side of the rupture disk 70, a score line 85 may alternatively be placed on the concave side of a rupture disk 80, as illustrated in FIGS. 8A and 8B.

In yet another embodiment, a rupture disk may be manufactured using a progressive die set. In a progressive die set, the attributes of the rupture disk are produced sequentially in a single tool that moves the material forward from station to station with each stroke of the die press. Thus, using a progressive die set may obviate the need for manual and/or robotic-arm transportation of the rupture disk material from station to station. According to this method, a progressive die set may include one or more dies configured to, for example: place an indent into rupture disk material; form the rupture disk material into a dome or other appropriate shape; create a score line, shear line, or other area of weakness in the rupture disk material; form a flange portion in the rupture disk material; form a transition area in the rupture disk material; create a clear witness mark of the process employed; and perform any other appropriate rupture disk-forming or disk-marking task. In one example, the progressive die set may include one or more dies configured to add a transition area designed to improve the rupture disk's performance. For example, one or more dies may be configured to add a radius of transition selected to control the burst pressure of the rupture disk. As another example, one or more dies may be configured to provide a chamfer or a sharp corner at the transition area One or more of the dies in a progressive die set may provide a uniform transition area—i.e., one that takes a uniform configuration around the circumference of the transition area. Alternatively, or in addition, one or more of the dies may provide an irregular transition area—e.g., one that provides a feature at only a part of the transition area, provides a feature intermittently around a transition area, provides a combination of features around a transition area, or provides a feature that has varying dimensions along the transition area. The irregular or intermittent feature may be, e.g., one or more of a radius, chamfer, or sharp corner.

A progressive die set may be provided in a single line, or a progressive die set may be provided as a multiple-line die set, wherein more than one rupture disk may be pressed at the same time. So-called multi-line or multi-lane progressive die sets may be used consistent with the principles of this disclosure.

Each die in a progressive die set may be applied using mechanical and/or hydraulic action. In an embodiment where the progressive die set includes multiple dies, the present disclosure contemplates applying each die to the rupture disk material in any suitable order.

In one embodiment, a progressive die set may be used to form a reverse-buckling rupture disk. In another embodiment, a progressive die set may be used to form a miniaturized rupture disk.

A progressive die set may be used to manufacture a reverse buckling disk having a structural modifier. A structural modifier could be an indentation in the apex of a rupture disk's dome, such as the apex indentation illustrated in FIGS. 5C, 7B, 7C, and 8, and the apex indentation disclosed in co-owned U.S. Pat. Nos. 5,995,605, 6,178,983, and 6,446,653, the entire contents of each of which are hereby expressly incorporated by reference. A structural modifier also could be an offset crown as disclosed in co-owned U.S. Pat. No. 5,570,803, the entire contents of which are hereby expressly incorporated by reference. Alternatively, a structural modifier could take the form of a compound dome shape, such as illustrated in FIG. 10. As shown in FIG. 10, in a compound dome shape there are at least two shapes superimposed in the domed area of a generally spherical form. In FIG. 10, the compound dome shape has a truncated cone shape 101 at its base and a generally spherical shape 103 above the base. A progressive die set may be used to make any number of different compound dome shapes, which may be, for example, a combination of cones, truncated cones, rounded/spherical shapes, truncated rounded/spherical shapes, and/or cylinders. In addition, a compound dome shape may be an irregular compound shape. One exemplary irregular compound shape exhibits a transition between the at least two superimposed shapes that is not concentric with the rupture disk. In another exemplary irregular compound shape, the at least two superimposed shapes may not be present all around a circumference of the rupture disk. That is, one or more of the superimposed shapes may be intermittent.

In a progressive die set, forming a structural modifier may require that the rupture disk material be at least partially restrained on both top and bottom surfaces when the structural modifier is formed. Thus, if a structural modifier, such as an indent, is added to an already domed portion of a rupture disk, then the restraints or dies must be specially selected to account for the curvature of the domed portion at the precise location to be indented. Accordingly, if different batches of rupture disks are intended to have indentations at different locations of a domed shape, a new set of indenting restraints and/or dies would be required for each different location. In light of the foregoing, in one embodiment, manufacture may be facilitated by forming the structural modifier in the rupture disk material before the domed or other rounded shape is formed. In this way, the structural modifier may be formed into a generally flat material, rather than a curved or domed material. This allows the structural-modifier-forming portion of the progressive die set to be used with many different batches of rupture disks, regardless of where in the domed shape the indentation is to be formed. When the indentation or other structural modifier is formed before the dome shape is formed, the indentation or other structural modifier may be smoothed away before forming the dome, during forming the dome, or after forming the dome.

A progressive die set may be used with coil material, which may be a metal coil material. The coil material may be fed through the progressive die set for forming a plurality of miniaturized rupture disks from a single length of coil material. One or more guides may be used to position the coil material as it is fed through the progressive die set. To minimize cost and waste, the coil material may be selected to have a long length and a width selected to minimize excess material. Such coil material may have a width, for example, close to the diameter of the desired rupture disk's flange.

Figure 11:
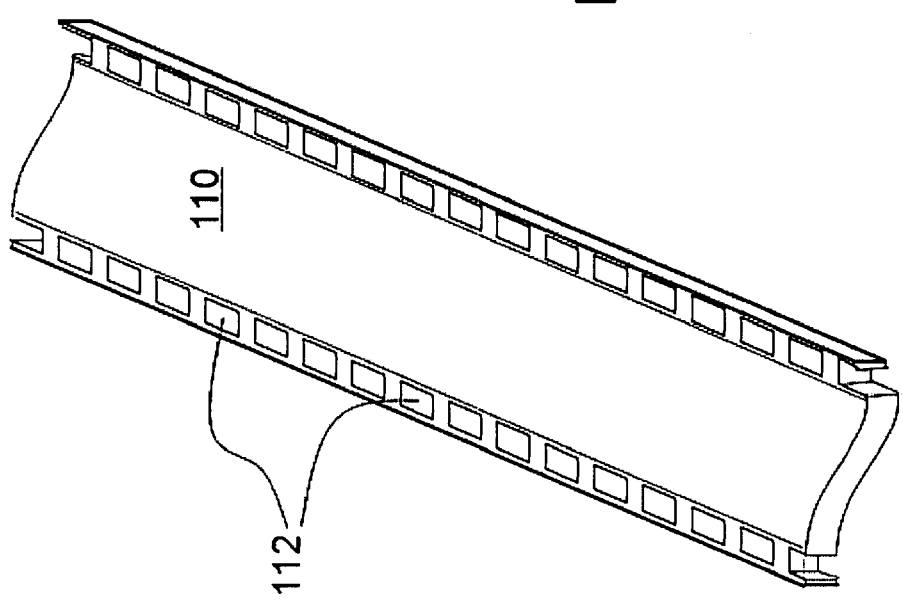
FIG. 11 illustrates a coil material for use in the manufacture of a rupture disk according to an embodiment of the disclosure.

In one embodiment, metal coil material may be provided with a set of guide holes 112 along at least one side of the coil material 110, as illustrated in FIG. 11. The guide holes may take a form similar to the guide holes found in 35 mm photographic film. A guide may advance the coil through a progressive die set, and/or determine the distance by which the coil should be advanced, through interaction with these guide holes.

In one embodiment of a method for manufacturing a miniaturized rupture disk from relatively flat coil material, the coil material may be fed through a progressive die set. A section of coil material receives an indent from a first die. That section of coil material is then advanced to a second die, which imparts a dome shape into a disk material coupon, still held in the coil material. The section of coil material is then advanced to a third die, which imparts a score line or other area of weakness into the disk. The section of coil material is then advanced to a position in which the outside diameter of the rupture disk may be blanked, allowing the disk to be removed from the coil material. Although the progressive die set has been disclosed as being applied to the coil in a particular order, the present disclosure is not limited to that embodiment. Coil material may be processed into a rupture disk by progressive dies applied in any suitable order. Furthermore, more or fewer dies, providing more or fewer features to a rupture disk, may be used as part of a progressive die set.

While the above described embodiments of a rupture disk have been depicted as utilizing spherically domed rupture disks, the disclosure is not intended to be limited to this particular structure. Therefore, alternative rupture disks are intended to be within the scope of this disclosure, including all equivalent shapes of domes, and ovoid and other shapes that are substantially arcuate in cross section. Also, although the above described embodiments of a rupture disk have been depicted as being made of metal, this disclosure is not intended to be limited to that material alone. Therefore, embodiments of the described rupture disk may also be made of any other suitable material, such as plastic or ceramic. The above disclosure describes a number of exemplary rupture disk burst pressures in psig; however, the disclosure is not limited to any particular burst pressures or ranges of burst pressures. Additionally, it is contemplated that individual features of one embodiment may be added to, or substituted for, individual features of another embodiment. Accordingly, it is within the scope of this disclosure to cover embodiments resulting from substitution and replacement of different features between different embodiments.

The above described embodiments and arrangements are intended only to be exemplary of contemplated mechanisms and methods. Other embodiments will be apparent to those skilled in the art from consideration of the specification and practice of the disclosure herein.

What is claimed is:

1. A rupture disk, comprising:
   a flange portion;

a rupturable portion; and
a structural modifier comprising a truncated conical shape;
wherein the rupture disk has a diameter of about one inch or less;
wherein the flange portion intersects with the rupturable portion, and wherein the intersection between the flange portion and the rupturable portion defines a radius of transition; and
wherein the radius of transition is configured to determine a pressure at which the rupturable portion will rupture.

2. The rupture disk of claim 1, wherein the rupture disk is a reverse-acting rupture disk having a convex surface configured to be oriented toward a pressurized system.

3. The rupture disk of claim 2, wherein the rupturable portion is configured to reverse before the rupturable portion ruptures.

4. The rupture disk of claim 2, wherein the convex surface of the reverse-acting rupture disk is configured to remain in a convex shape during and after rupture of the rupturable portion.

5. The rupture disk of claim 1, further comprising:
a score line defined by the rupturable portion.

6. The rupture disk of claim 5, wherein the score line is substantially circular.

7. The rupture disk of claim 5, wherein the score line is substantially oval.

8. The rupture disk of claim 5, wherein the score line is substantially X shaped.

9. The rupture disk of claim 1, wherein the rupturable portion has an apex, and wherein the structural modifier comprises an indentation defined in the apex of the rupturable portion.

10. The rupture disk of claim 1, wherein the radius of transition is smaller than a thickness of the rupture disk.

11. The rupture disk of claim 10, wherein the radius of transition is between about 0.001 inch and about 0.010 inch.

12. The rupture disk of claim 10, wherein the rupture disk is manufactured from coil metal.

13. The rupture disk of claim 10, wherein the rupturable portion is dome-shaped.

14. The rupture disk of claim 13, wherein the dome shape is substantially spherical.

15. A rupture disk, comprising:
a flange portion; and
a rupturable portion;
wherein the flange portion intersects with the rupturable portion, and wherein the intersection between the flange portion and the rupturable portion defines a radius of transition;
wherein the diameter of the rupture disk is about ¾-inch or less,
wherein the rupturable portion is configured to rupture at a burst pressure, and
wherein the radius of transition is configured to determine the burst pressure;
wherein the radius of transition is configured to minimize a temperature sensitivity of the burst pressure; and
wherein a variation factor of the rupturable portion is less than about two-thirds of a variation factor of a rupture disk having a diameter of about one inch or more.

16. A rupture disk, comprising:
a flange portion; and
a rupturable portion;
wherein the flange portion intersects with the rupturable portion, and wherein the intersection between the flange portion and the rupturable portion defines a radius of transition;
wherein the diameter of the rupture disk is about ¾-inch or less,
wherein the rupturable portion is configured to rupture at a burst pressure, and
wherein the radius of transition is configured to determine the burst pressure;
wherein the radius of transition is configured to minimize a temperature sensitivity of the burst pressure; and
wherein a variation factor of the rupturable portion is less than about one-half of a variation factor of a rupture disk having a diameter of one inch or more.

17. A rupture disk, comprising:
a flange portion; and
a rupturable portion;
wherein the flange portion intersects with the rupturable portion, and wherein the intersection between the flange portion and the rupturable portion defines a radius of transition;
wherein the diameter of the rupture disk is about ¾-inch or less,
wherein the rupturable portion is configured to rupture at a burst pressure, and
wherein the radius of transition is configured to determine the burst pressure;
wherein the radius of transition is configured to minimize a temperature sensitivity of the burst pressure; and
wherein a variation factor of the rupturable portion is below that of a Nickel Alloy 600 forward-acting rupture disk of the same diameter.

18. A rupture disk, comprising:
a flange portion; and
a rupturable portion;
wherein the flange portion intersects with the rupturable portion, and wherein the intersection between the flange portion and the rupturable portion defines a radius of transition;
wherein the diameter of the rupture disk is about ¾-inch or less,
wherein the rupturable portion is configured to rupture at a burst pressure, and
wherein the radius of transition is configured to determine the burst pressure;
wherein the radius of transition is configured to minimize a temperature sensitivity of the burst pressure; and
wherein a variation factor of the rupturable portion is less than about 0.1.

19. A rupture disk having a diameter of about ¾-inch or less, comprising:
a flange portion; and
a rupturable portion comprising a structural modifier, the rupturable portion configured to rupture at a burst pressure;
wherein the flange portion intersects with the rupturable portion, and wherein the intersection between the flange portion and the rupturable portion defines a radius of transition, wherein the radius of transition is configured to determine the burst pressure;
wherein the structural modifier is configured to minimize a temperature sensitivity of the burst pressure; and
wherein a variation factor of the rupturable portion is less than about two-thirds of a variation factor of a rupture disk having a diameter of about one inch or more.

20. A rupture disk having a diameter of about ¾-inch or less, comprising:
- a flange portion; and
- a rupturable portion comprising a structural modifier, the rupturable portion configured to rupture at a burst pressure;
- wherein the flange portion intersects with the rupturable portion, and wherein the intersection between the flange portion and the rupturable portion defines a radius of transition, wherein the radius of transition is configured to determine the burst pressure;
- wherein the structural modifier is configured to minimize a temperature sensitivity of the burst pressure; and
- wherein a variation factor of the rupturable portion is less than about one-half of a variation factor of a rupture disk having a diameter of one inch or more.

21. A rupture disk having a diameter of about ¾-inch or less, comprising:
- a flange portion; and
- a rupturable portion comprising a structural modifier, the rupturable portion configured to rupture at a burst pressure;
- wherein the flange portion intersects with the rupturable portion, and wherein the intersection between the flange portion and the rupturable portion defines a radius of transition, wherein the radius of transition is configured to determine the burst pressure;
- wherein the structural modifier is configured to minimize a temperature sensitivity of the burst pressure; and
- wherein a variation factor of the rupturable portion is below that of a Nickel Alloy 600 forward-acting rupture disk of the same diameter.

22. A rupture disk having a diameter of about ¾-inch or less, comprising:
- a flange portion; and
- a rupturable portion comprising a structural modifier, the rupturable portion configured to rupture at a burst pressure;
- wherein the flange portion intersects with the rupturable portion, and wherein the intersection between the flange portion and the rupturable portion defines a radius of transition, wherein the radius of transition is configured to determine the burst pressure;
- wherein the structural modifier is configured to minimize a temperature sensitivity of the burst pressure; and
- wherein a variation factor of the rupturable portion is less than about 0.1.

* * * * *